United States Patent
Zheng et al.

(10) Patent No.: US 8,320,449 B2
(45) Date of Patent: Nov. 27, 2012

(54) METHOD FOR CONTROLLING VIDEO FRAME STREAM

(75) Inventors: Yongping Zheng, Shanghai (CN); Huafeng Mai, Shanghai (CN); Shih-Kuang Tsai, Shanghai (CN)

(73) Assignees: Inventec Appliances (Shanghai) Co., Ltd., Shanghai (CN); Inventec Appliances Corp., Taipei Hsien (TW)

(*) Notice: Subject to any disclaimer, the term of this patent is extended or adjusted under 35 U.S.C. 154(b) by 159 days.

(21) Appl. No.: 12/648,962

(22) Filed: Dec. 29, 2009

(65) Prior Publication Data

US 2010/0195732 A1 Aug. 5, 2010

(30) Foreign Application Priority Data

Feb. 3, 2009 (CN) .......................... 2009 1 0045735

(51) Int. Cl.
- *H04B 1/66* (2006.01)
- *H04N 7/12* (2006.01)
- *H04N 11/02* (2006.01)
- *H04N 11/04* (2006.01)

(52) U.S. Cl. .......... 375/240.02; 375/240.25; 375/240.26
(58) Field of Classification Search ........................ None
See application file for complete search history.

(56) References Cited

U.S. PATENT DOCUMENTS

| | | | |
|---|---|---|---|
| 6,031,584 A * | 2/2000 | Gray ........................ | 375/240.28 |
| 6,526,097 B1 * | 2/2003 | Sethuraman et al. ...... | 375/240.2 |
| 2006/0140270 A1 * | 6/2006 | Li et al. .................... | 375/240.12 |
| 2006/0256822 A1 * | 11/2006 | Kwong et al. ............... | 370/503 |
| 2007/0152908 A1 * | 7/2007 | Khan et al. ...................... | 345/16 |
| 2007/0201500 A1 * | 8/2007 | Deshpande ................... | 370/412 |

* cited by examiner

*Primary Examiner* — Joseph Ustaris
*Assistant Examiner* — Edemio Navas, Jr.
(74) *Attorney, Agent, or Firm* — McDermott Will & Emery LLP

(57) ABSTRACT

A method for controlling video frame stream at a transmitting end of video phone is provided. The method predetermines whether receiving the current frame will cause delay based on a situation of transmitting and compression of the previous video frames. If the result of the predetermination is yes, the current video frame is skipped; if the result of the predetermination is no, the follow-up compression, multiplexing and transmitting of the current video frame are performed.

4 Claims, 4 Drawing Sheets

PRIOR ART

METHOD FOR CONTROLLING VIDEO FRAME STREAM

BACKGROUND

1. Technical Field

The present invention generally relates to video transmission and, more particularly, to methods for controlling video frame stream at transmitting ends of video phones.

2. Discussion of Related Art

With the popularization of 3G network, more consumers favor 3G mobile phones with video functions. In addition to the existing audio experience, these kinds of 3G mobile phones can also provide a video experience for a user through real-time video images, which greatly enhances the user's enjoyment.

However, the existing video phone has a problem of video delay in call. The reasons of the video delay include: network delay, local delay on processing and transmitting video frames, etc. The advancement of 3G network will significantly improve The network delay. A major reason for local delay is that the captured video frame data needs to be compressed and multiplexed following 3G-324M H.223 multiplexing protocol before transmitting the data via a wireless network.

During a communication process of video phone, an application program at each terminal device is not only used as a transmitting end but also as a receiving end, which transmits video and audio data at this side to another end and at the same time receives and plays video and audio data from the other end. A sampling frequency for video frames at the transmitting end is set by the system. At present, the upper limit of the sampling frequency for video phone with 64 kb/s bandwidth is generally set around 15 frames per second. The video frame data captured by a camera is first compressed, and then the compressed AV data are multiplexed with the H.223 multiplexing protocol of 3G-324M into binary streaming data.

FIG. 5 illustrates an existing AV data processing process by an application program on a transmitting end of video phone.

When a calling of the video phone is connected, a handshake in the 3G-324M layer is first performed. After the handshake, if a negotiation between both ends of the video phones is successful, the transmitting end of the system will enter into the process as illustrated in FIG. 5. The process includes the steps of: capturing audio data by a microphone, compressing the captured audio data; capturing video data by a camera, compressing the captured video data; multiplexing audio and video data stream based on the H.223 protocol of 3G-324M 300; and transmitting the multiplexed data streams via a wireless network.

In the process described above, the audio data and video data are captured by their respective hardware devices, compressed in their respective formats according to the handshake negotiation mechanism, and then multiplexed into a single binary data stream with the sub-protocol H.223 of the 3G-324M. Finally, the multiplexed data stream is transmitted to the opposite end via a wireless network.

Process at the receiving end is a reversed process. The receiving end demultiplexes the received binary data stream with H.223 protocol, and divides it into video data and audio data. Then, the video data and audio data are respectively decompressed and transmitted to corresponding hardware for playing.

Because the existing video phone operates in a 64 kb/s bandwidth of circuit domain, the sampling frequency of video frame for the camera, set with an upper limit, will fluctuate in accordance with a load change of the system. Therefore, the video frames captured per unit time may vary. When the load of the system is high, the data captured from the camera often can not be compressed and multiplexed with H.223 in time. Consequently, a large amount of multiplexed data stays in the transmitting queue and cause a delay of video frames at the receiving end. As a result, the video frames and audio data are transmitted asynchronously so as to weaken the performance of the video phone.

The reasons of the video delay are briefly analyzed hereinafter.

Processing each video frame includes two steps: capturing video data and transmitting video data. Capturing video data further includes capturing video frames and compressing the video frames. In the step of capturing video data, the camera captures video frames at a predetermined interval, such as for example, in a case of 15 frames per second, time interval between each frame is about 0.067 sec. The captured video frames are then compressed to obtain the compressed video frame data. The compressed video frame data is transmitted via the wireless network.

Therefore, after data compression of one video frame is completed, the compressed video frame data is transmitted immediately. That is, under normal circumstances, when data compression of a first video frame is completed, the compressed first video frame data is transmitted; and when data compression of a second video frame is completed, transmitting of the first video frame data has already been completed, at which point the second video frame data can be transmitted, and so on.

With reference to FIG. 4, in each predetermined interval, the camera in turn captures a video frame F1, F2, F3, . . . , F8; compressing times for the corresponding video frames are C1, C2, C3, . . . , C8, respectively; and transmitting times for the corresponding video frames are S1, S2, S3, . . . , S8, respectively.

The transmitting time S1 for the first video frame F1 starts at a time point when the compressing time C1 for the first video frame F1 ends. The transmitting time S2 for the second video frame F2 starts at a time point when the compressing time C2 for the second video frame F2 ends. As shown in FIG. 4, under conditions of successive transmitting, the transmitting time S1 for the first video frame F1 ends prior to the time point when the compressing time C2 for the second video frame F2 ends, so that the transmitting time S2 for the second video frame F2 can start; and the transmitting time S2 for the second video frame F2 ends prior to the time point when the compressing time C3 for the third video frame F3 ends, so that the transmitting time S3 for the third video frame F3 can start. The first to sixth video frames F1-F6 have the same situation, as shown in FIG. 4.

However, at a time point that the compressing time C7 for the seventh video frame F7 ends, the transmitting time S6 for the sixth video frame F6 has not ended. Thus, the transmitting time S7 for the seventh video frame F7 can not start until the transmitting time S6 for the sixth video frame F6 ends, so that the transmitting for the seventh video frame is delayed. Similarly, at a time point that the compressing time C8 for the eighth video frame F8 ends, the transmitting time S7 for the seventh video frame F7 has not ended. Thus, the transmitting time S8 can not start until the transmitting time S7 for the seventh video frame F7 ends, so that transmitting for the eighth video frame is delayed.

It can be seen from the exemplary embodiment described above that, if transmission of the previous video frame data has not completed when compressing of the current video frame data completes, the current video frame data can not be transmitted until the transmitting for the previous video frame data is completed, which results in delay of video transmission. Furthermore, if a succession of frames are delayed, these delays will be accumulated to cause that the video transmitting seriously lag behind the audio transmitting, which weakens the use effect of the video phone.

BRIEF DESCRIPTION OF THE DRAWINGS

FIGS. 3a and 3b are timing diagram illustrating transmitting of video frames in accordance with the present invention;

FIG. 4 is a timing diagram illustrating transmission of video frames in a existing video phone.

DETAILED DESCRIPTION

Figure 1:
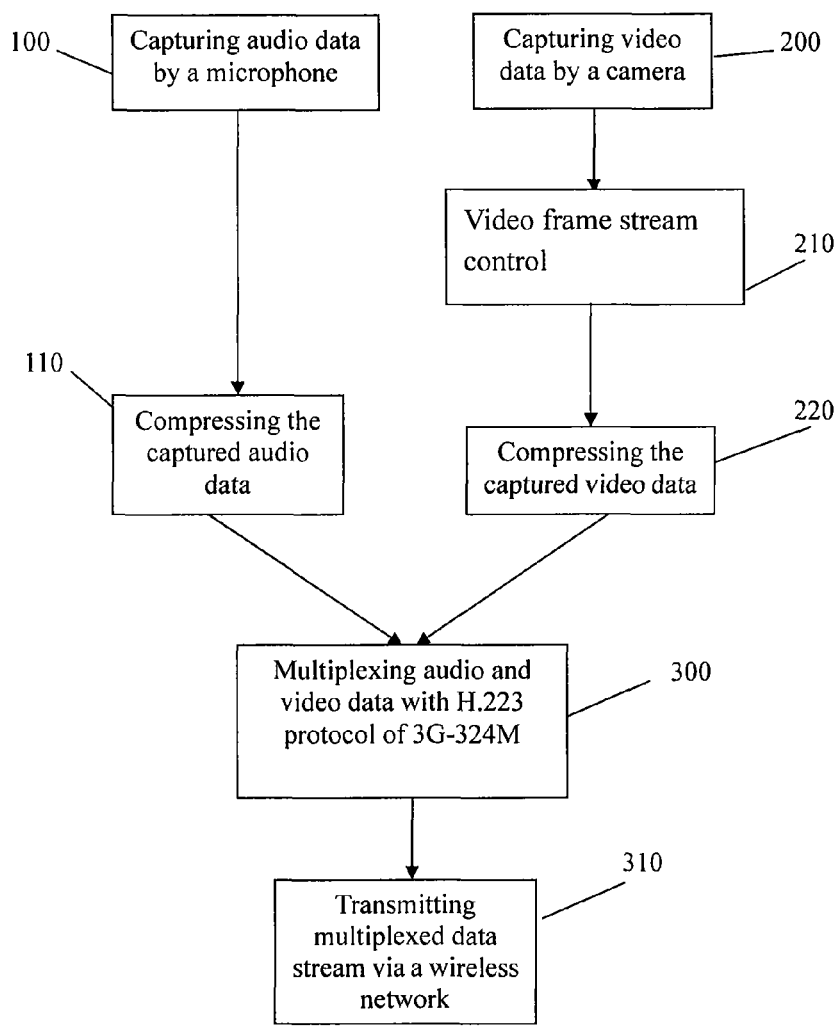
FIG. 1 is a flowchart illustrating a process at a transmitting end of video phone in accordance with the present invention.

The present invention provides a method for controlling video frame stream to reduce delay in video transmission. Specifically, when a calling of a video phone is connected, a handshake in the 3G-324M layer is performed. After the handshake, if a negotiation between both sides of the video phones is successful, the transmitting end of the respective systems enters into the process as shown in FIG. 1.

The process includes the following steps: capturing audio data by a microphone at 100, compressing the captured audio data at 110; capturing video frame data by a camera at 200; performing at 210; a stream control process for the captured video frame data; compressing the processed video frame data at 220; multiplexing audio and video data stream based on the H.223 protocol of 3G-324M at 300; and transmitting the multiplexed data streams via a wireless network at 310.

It can be seen that, compared with the prior art process, the step 210 of stream control for the video frame data captured by the camera is added before the step 220. The main function of the step 210 of stream control processing is a real-time adjustment for the video frame data so as to eliminate delay in transmitting of the video frame data while fully using the 64 kb/s bandwidth.

Figure 2:
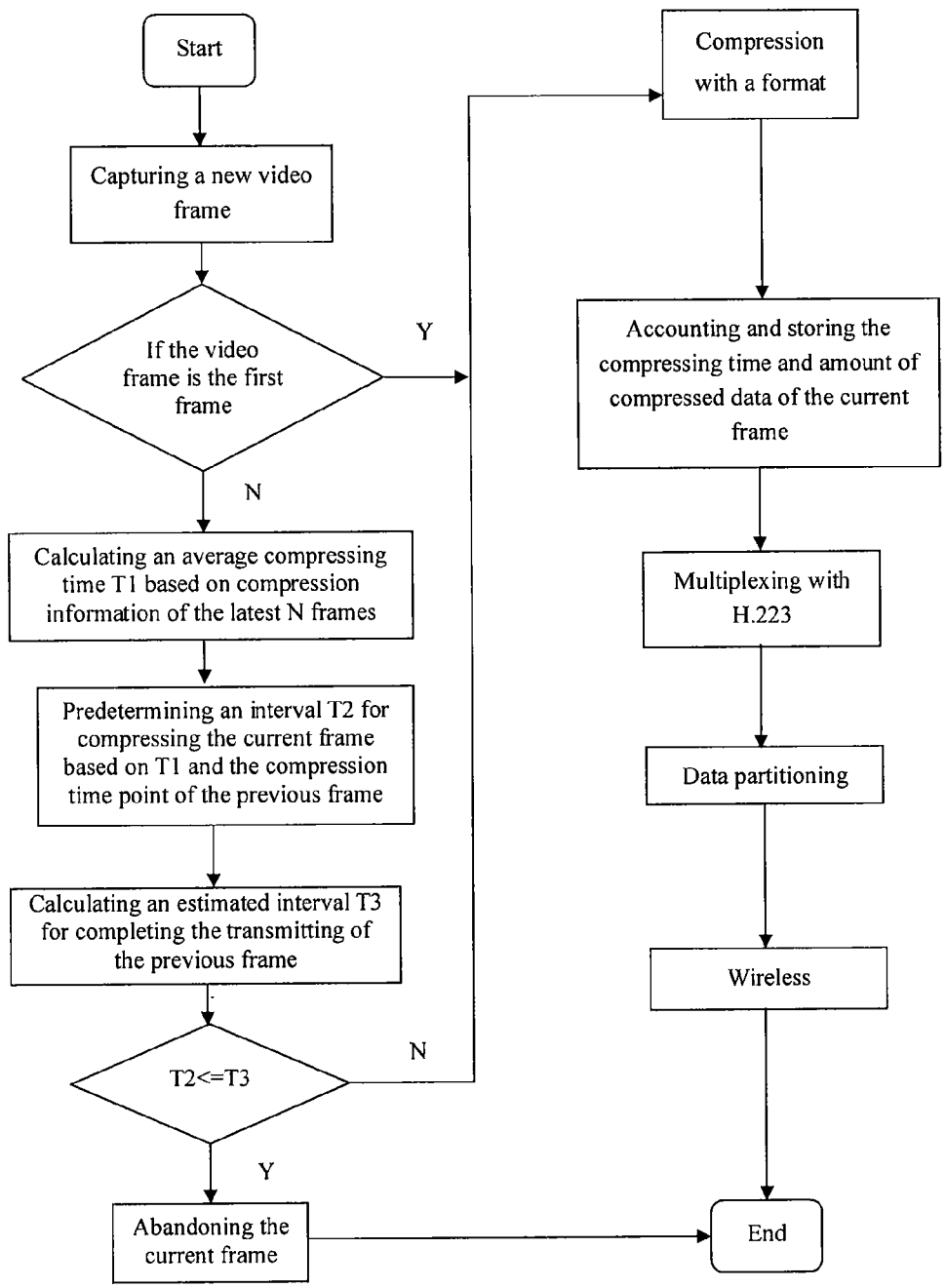
FIG. 2 is a flowchart illustrating a process of a video frame controlling module in accordance with the present invention.
Figure 5:
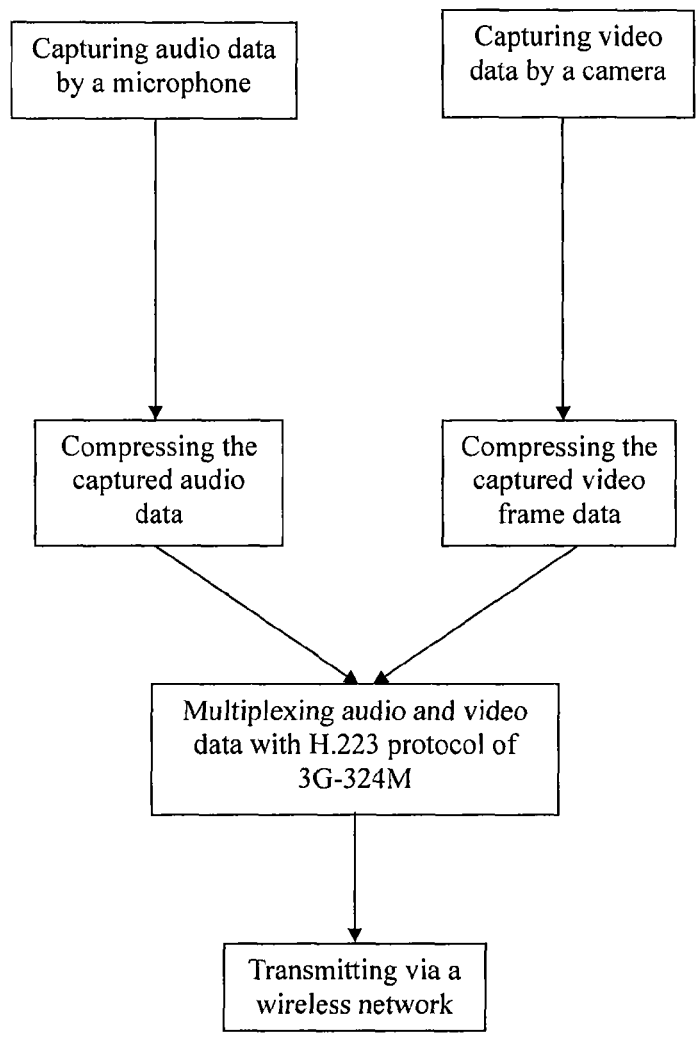
FIG. 5 is a flowchart illustrating a process at a transmitting end of a existing video phone.

The process for controlling the video frame data stream is shown in FIG. 2 and described below in detail.

Start; capture a video frame; and determine whether the video frame is the first video frame.

If a current video frame is the first video frame, then compressing the current video frame data; counting and storing a compressing time and a bit number of the compressed current video frame data; multiplexing with H.223; partitioning the data; wireless transmitting; and then going to the end, are executed.

If the current video frame is not the first video frame, an interval T2 for completing the compression of the current video frame data is estimated. If the estimated interval T2 is less than or equal to an interval T3 for transmitting a previous video frame data, the current video frame is abandoned; if the estimated interval T2 is larger than the interval T3, steps the same as those for the first video frame are executed.

In the above steps, the interval T2 is estimated using the following formula: T2=(a time point when the current video frame is captured−a time point when compression of the previous video frame is completed)+T1, wherein T1 is an estimated time for completing compression of the current video frame data. In this embodiment, the estimated time for completing compression of the current video frame data T1 equals to an average compressing time of the latest N video frames. Although N can be any number on demand, preferably it is between 5-10.

T3=a bit number of the previous video frame data/(bandwidth−sum of the bit number of compressed audio data captured per unit time).

If the number of the current video frame is less than or equal to N, the average compressing time is calculated according to the actual accumulated amount of video frames. For example, in a case of N equals to 5, when the current video frame is the second video frame, the average compressing time is the compressing time of the first video frame; when the current video frame is the third video frame, the average compressing time is the average compressing time of the first and second video frames; when the current video frame is the fourth video frame, the average compressing time is the average compressing time of the first to third video frames; and when the current video frame is the fifth video frame, the average compressing time is the average compressing time of the first to fourth video frames.

When the current video frame is the sixth video frame, the average compressing time is the average compressing time of the first to fifth video frames. Thereafter, the average compressing time is calculated according the latest five video frames.

Figures 3A, 3B, 4:
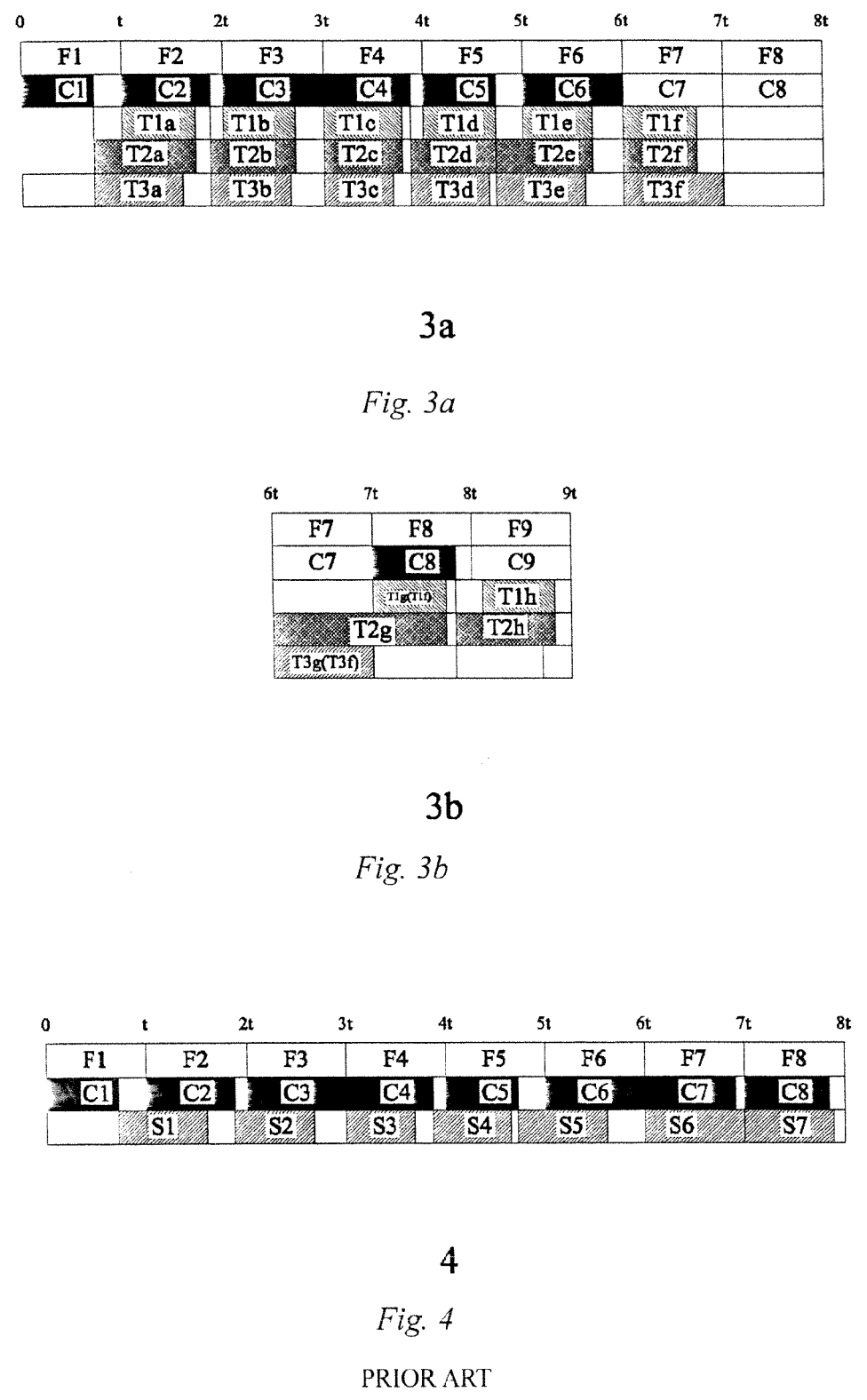

With reference to FIGS. 3a-3b, at each predetermined interval, the camera in turn captures video frames F1, F2, F3, . . . ; and the compressing times for the corresponding video frames are C1, C2, C3, . . . . The corresponding average compressing time of the latest N (e.g. N=5) video frames from the current video frame are T1a, T1b, T1c, . . . ; and the estimated intervals for completing compression of the current video frame data are T2a, T2b, T2c, . . . ; and the intervals for completing transmitting of a previous video frame data are T3a, T3b, T3c, . . . .

In an exemplary embodiment shown in FIG. 3, time for capturing the first video frame F1 is zero, time for compressing is C1, and the interval for completing transmitting of the first video frame F1 is T3a, which equals to the amount that the compressed first video frame data/(bandwidth−sum of the bit number of compressed audio data captured per unit time).

When the second video frame F2 is captured, the interval T2a for completing compression of the second video frame F2 is estimated. T2a=(the time point when the second video frame is captured−the time point when compression of the first video frame data is completed)+T1a. As only the first video frame is compressed, the T1a equals to compressing time C1 of the first video frame. T2a is compared with T3a. If T2a>T3a, then transmitting of the first video frame data has been completed when compression of the second video frame F2 is completed, so that transmitting of the second video frame data can be performed and the actual compression of the second video frame F2 is allowed. If T2a<T3a, then transmitting of the first video frame date has not been completed when compression of the second video frame F2 is completed, so the second video frame F2 is abandoned and compression of the second video frame F2 will not be performed.

In the exemplary embodiment illustrated in FIG. 3, T2a>T3a, compression and transmitting of the second video frame F2 can be performed. Given that in the second to sixth video frames F2-F6, all the T2s are larger than the corresponding T3s, i.e., T2a>T3a; T2b>T3b; T2c>T3c; T2d>T3d, T2e>T3e. Then all the second to sixth video frames are compressed and transmitted, as illustrated in FIG. 3a.

When the seventh video frame F7 is captured, the estimated T2f=(the time point when the seventh video frame is captured–the time point when compression of the sixth video frame is completed)+T1$f$, wherein T1$f$ equals to the average compressing time of the second video frame F2 to the sixth video frame F6. If T2$f$<T3$f$, then transmitting of the sixth video frame F6 has not been completed at the estimated time point when compression of the seventh video frame is completed. In this case, the seventh video frame F7 is abandoned and will not be compressed, as illustrated in FIG. 3$a$.

As illustrated in FIG. 3$b$, when the eighth video frame F8 is captured, the average compressing time T1$g$ equals to T1$f$ because the seventh video frame F7 is abandoned and is not compressed and transmitted. T2$g$=(the time point when the eighth video frame is captured–the time point when the compression of the sixth video frame is completed)+T1$g$, so T2$g$ is one frame interval more than T2$f$. Since the seventh video frame being abandoned, the interval T3$g$ for completing transmitting of the previous video frame data equals to the interval T3$f$ for completing transmitting of the sixth video frame F6. If T2$g$>T3$g$, the eighth video frame F8 can be compressed and transmitted.

If T2$g$ is still less than T3$g$, the eighth video frame F8 is also abandoned and the ninth video frame F9 is estimated. In this case, the estimated time T2$h$ for completing compression of the ninth video frame F9 will be two frame intervals more than T2$f$ while the interval T3$h$ for completing transmitting of the previous video frame is unchanged and still equals to the interval T3$f$ for completing transmitting of the sixth video frame F6. In a situation of one frame being abandoned, T2 will increase by one frame interval while T3 is unchanged. With the number of the abandoned frame increasing, T2 will be eventually larger than T3. At this time, the current video frame will be compressed and transmitted.

An exemplary embodiment is given to further explain the method for controlling video frame stream in accordance with the present invention. In this embodiment, one frame video data is captured per 0.06 seconds, and the average compressing time is calculated based on the compressing time of the latest five video frames. Table 1 illustrates related parameters of each video frame data.

In this embodiment, the interval for capturing the video frame is 0.06 seconds. If the time point when the first video frame is captured is set as zero, then the time point when the second video frame is captured is 0.06 seconds, the time point when the third video frame is captured is 0.12 seconds, the time point when the fourth video frame is captured is 0.18 seconds, and so on.

The compressing time of the current frame equals to actual time for completing compression of the current frame. The time point when compression of the previous frame is completed equals to the time point when the previous frame is captured plus compressing time of the previous frame.

As illustrated in Table 1, when the current frame is the second frame, the time point when compression of the first frame is completed equals to the time point (0) when the first frame is captured plus the compressing time (0.04) of the first frame, i.e. 0.04 seconds. That is, the compression of the first video frame is completed at 0.04 seconds. When the current video frame is the third frame, the time point when compression of the second frame is completed equals to the time point (0.06) when the second frame is captured plus compressing time (0.06) of the second frame, i.e. 0.12 seconds. That is, the compression of the second video frame is completed at 0.12 seconds. The related parameters of the following frames are obtained according to the same manner.

The time point when compression of the previous frame is completed is the time point when transmitting of the previous frame starts.

The average compressing time T1 is the average compressing time of the latest five frames. When the number of the frame is less than or equal to five, the average compressing time T1 is calculated based on the number of actually received frames. Therefore, the average compressing time is the average compressing time of the latest five frames after the sixth frame.

The estimated interval T2 for completing compression of the current video frame=(the time point when the current frame is captured–the time point when compression of the previous frame is completed)+T1. Based on this formula, the estimated interval T2 for the second frame equals to the time point when the second frame is captured minus the time point when compression of the first frame is completed plus the average compressing time, i.e., T2=0.06−0.04+0.04=0.06 seconds. The interval means that, from the time point when compression of the previous frame is completed, in theory, compression of the current frame should be completed in the interval T2.

T3 is the time for completing transmitting of the previous video frame. For example, T3 for the second frame is the time

TABLE 1

(unit: second)

| Number of frame | Time point when the current frame is captured | Compressing time of the current frame | Time point when compression of the previous frame is completed | Average compressing time T1 of the latest 5 frames | Estimated interval T2 for completing compression of the current video frame | Interval T3 for completing transmitting of the previous video frame |
|---|---|---|---|---|---|---|
| 1 | 0 | 0.04 | — | — | — | — |
| 2 | 0.06 | 0.06 | 0.04 | 0.04 | 0.06 | 0.04 |
| 3 | 0.12 | 0.05 | 0.12 | 0.05 | 0.05 | 0.05 |
| 4 | 0.18 | 0.06 | 0.17 | 0.05 | 0.06 | 0.055 |
| 5 | 0.24 | 0.04 | 0.24 | 0.053 | 0.053 | 0.05 |
| 6 | 0.30 | 0.06 | 0.28 | 0.05 | 0.07 | 0.06 |
| 7 | 0.36 | — | 0.36 | 0.054 | 0.054 | 0.06 |
| 8 | 0.42 | 0.05 | 0.36 | 0.054 | 0.114 | 0.06 |
| 9 | 0.48 | ... | ... | ... | ... | ... | for completing transmitting of the first video frame, and T3 for the third frame is the time for completing transmitting of the second video frame, and so on.

In the table 1, all the estimated intervals T2 for the second to sixth frames are larger than the respective intervals T3. That is, when compression of the current frame is completed, transmitting of the previous video frame has been completed, so that transmitting of the current video frame will not cause delay.

In the seventh frame, the corresponding T2=0.054, and the corresponding T3=0.06, which is larger than T2. If the seventh frame were to compressed and transmitted, the transmission of the sixth frame would not be completed when the compression of the seventh frame was completed. This would cause a delay in transmitting of the seventh frame. Therefore, the seventh frame is abandoned, and will not be compressed.

In the eighth frame, due to the seventh frame being abandoned, the corresponding T2 is increased by one frame interval (0.06), so T2=0.114 while T3 is unchanged and still is 0.06. In this case, T2 is larger than T3, the eighth frame can be compressed and without delay.

According to an embodiment, whether the compression of current frame will cause delay can be predetermined by using method described above. If it is determined that the delay will not occur, the compression, multiplexing, and transmitting of the current frame can be performed. If it is determined that the delay will occur, the current frame is skipped. The frame skipping is repeated until it is determined that the delay will not occur.

In another embodiment, the average compressing time T1 of the invention can be calculated by an accumulation manner instead of being calculated from the latest N frames as mentioned above. That is, when the number of the current frame is N, the average compressing T1 can be an average time of all the frames transmitted. For example, when the current frame is the seventh frame, the average compressing time T1 is the average compressing time of the first to sixth frames (given that any one of the first to sixth frames is not abandoned).

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method for controlling a video frame stream at a transmitting end of a video phone, the method comprising:
   a) capturing a video frame as a current frame;
   b) determining whether the current frame is the first frame;
   c) if the current frame is the first frame, then
      c1) compressing the current frame;
      c2) accounting and storing a compressing time of the current frame and an amount of a compressed data; and
      c3) transmitting the compressed data via a wireless network; and
   d) if the current frame is not the first frame, then
      d1) determining whether an estimated interval (T2) for completing compression of the current frame is less than or equal to an interval (T3) for completing transmitting of the previous frame;
      d2) if the estimated interval (T2) for completing compression of the current frame is less than or equal to the interval (T3) for completing transmitting of the previous frame, the current frame is abandoned, and
      d3) if the estimated interval (T2) for completing compression of the current frame is larger than the interval (T3) for completing transmitting of the previous frame, then the steps of c1)-c3) are performed,
   wherein the interval (T3) for completing transmitting of the previous frame is equal to a quotient obtained by dividing a bit number of the previous frame by a difference between the bandwidth of the video phone and a sum of the bit number of compressed audio data captured per unit time.

2. The method according to claim 1, wherein the estimated interval (T2) for completing compression of the current frame is equal to a time point when the current frame is captured minus a time point when compression of a previous frame is completed plus an average compressing time (T1).

3. The method according to claim 2, wherein the average compressing time (T1) equals to an average compressing time of the latest N frames before the current frame.

4. A method for controlling a video frame stream at a transmitting end of a video phone, the method comprising:
   a) capturing a video frame as a current frame;
   b) determining whether the current frame is the first frame;
   c) if the current frame is the first frame, then
      c1) compressing the current frame;
      c2) accounting and storing a compressing time of the current frame and an amount of a compressed data; and
      c3) transmitting the compressed data via a wireless network; and
   d) if the current frame is not the first frame, then
      d1) determining whether an estimated interval (T2) for completing compression of the current frame is less than or equal to an interval (T3) for completing transmitting of the previous frame;
      d2) if the estimated interval (T2) for completing compression of the current frame is less than or equal to the interval (T3) for completing transmitting of the previous frame, the current frame is abandoned, and
      d3) if the estimated interval (T2) for completing compression of the current frame is larger than the interval (T3) for completing transmitting of the previous frame, then the steps of c1)-c3) are performed,
   wherein:
      the estimated interval (T2) for completing compression of the current frame is equal to a time point when the current frame is captured minus a time point when compression of a previous frame is completed plus an average compressing time (T1),
      the average compressing time (T1) equals to an average compressing time of the latest N frames before the current frame,
      N is larger than or equal to 5 and is less than or equal to 10, and
      the interval (T3) for completing transmitting of the previous frame is equal to a quotient obtained by dividing a bit number of the previous frame by a difference between the bandwidth of the video phone and a sum of the bit number of compressed audio data captured per unit time.

* * * * *